Patented Aug. 2, 1949

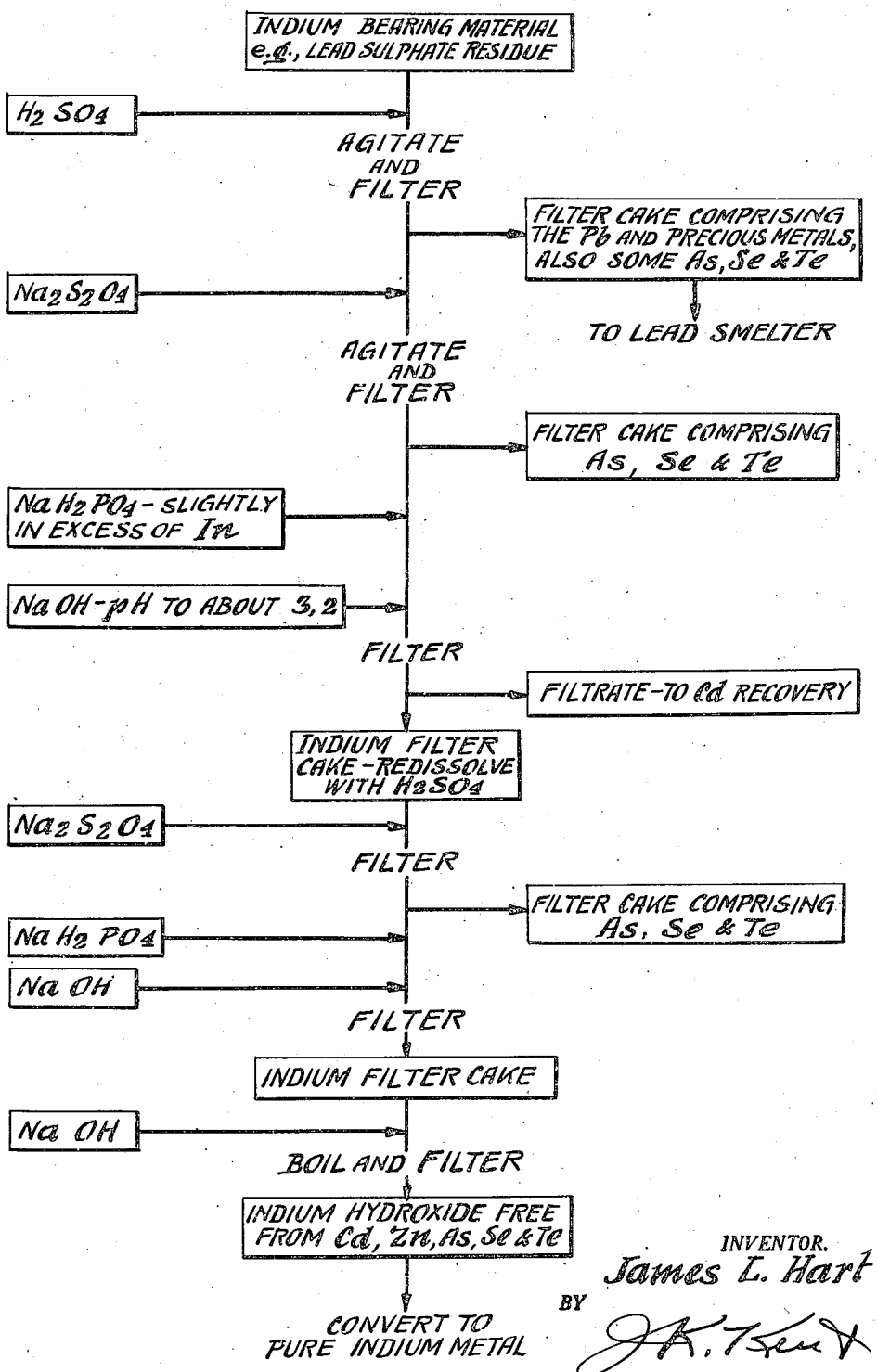

UNITED STATES PATENT OFFICE 2,477,799

PROCESS FOR SEPARATING INDIUM FROM CONTAMINANTS

James L. Hart, Bartlesville, Okla., assignor to American Smelting and Refining Company, New York, N. Y., a corporation of New Jersey Application June 28, 1947, Serial No. 757,764

4 Claims. (Cl. 23—23)

This invention relates to the art of recovering indium from indium-bearing materials and, more particularly, to the purification of indium solutions with respect to such contaminants as copper, arsenic, selenium, tellurium, etc.

Indium, like cadmium, commonly occurs as a minor constituent of certain zinciferous ores. When such ores are roasted, the indium passes into the fume along with cadmium, arsenic, lead and other constituents. In the usual practice of treating such fume to recover the cadmium, there remains a so-called lead sulphate residue normally comprising lead, arsenic and cadmium as major components together with such minor components as zinc, selenium, tellurium, iron, copper, etc. and the indium. The present invention affords decided advantages in recovering indium from such residues, and is generally applicable to the treatment of indium-bearing solutions from other sources which present a similar purification problem.

The drawing accompanying this specification and forming a part thereof is a flow sheet illustrating the process of the invention.

Briefly, the invention contemplates solubilizing the indium content of indium-bearing material by reaction with a suitable acid solution, and purifying the solution, particularly with respect to such contaminants as copper, arsenic, selenium and tellurium, by incorporating therein sodium hyposulphite ($Na_2S_2O_4$)—commonly sold in the trade under the name "sodium hydrosulphite"— and filtering. The indium is then ordinarily precipitated from the solution, preferably as indium phosphate or indium hydroxide, in which form it is readily amenable to conversion to indium metal. If desired or necessary, the indium precipitate may be redissolved, the hyposulphite purification step repeated and a second indium precipitate made, prior to converting to indium metal.

The specific example which follows is given to illustrate the process of the invention and, as will be seen from a reading thereof, the invention enables one to obtain a practically complete recovery of indium from the starting material.

In this instance, the original material consisting of 3,000 lbs. wet lead sulphate residues equivalent to 2330 lbs. on a dry basis analyzing 0.012 oz./T. Au and 4.0 oz./T. Ag and other constituents as shown in the accompanying table, was treated with 1060 lbs. 98% $H_2SO_4$ and 100 cu. ft. $H_2O$. The mass was thoroughly agitated and filtered thereby yielding 2170 lbs. wet filter cake equivalent to 1800 lbs. dry cake "A" analyzing 0.015 oz./T. Au and 5.2 oz./T. Ag and other constituents as set forth in the table below. The filtrate "B" amounted to 100 cu. ft. and contained the indium and amounts of other constituents shown in the table on a gram/liter basis.

Table of Analyses [1]

| Material | Pb | Cu | Cd | Zn | As | Se and Te | Fe | In |
|---|---|---|---|---|---|---|---|---|
| Original Material | 41.7 | 0.1 | 5.87 | 3.5 | 6.8 | 1.5 | 1.0 | 2.3 |
| Filter Cake "A" | 54.0 | .09 | 1.26 | 0.3 | 2.0 | 0.5 | 0.05 | 0.05 |
| Filtrate "B" | None | 0.1 | 18.2 | 12.1 | 19.5 | 4.2 | 3.5 | 8.4 |
| Filter Cake "C" | None | 0.5 | ------ | ------ | 59.0 | 7.2 | ------ | 0.1 |
| Filter Cake "D" | None | ------ | .16 | 1.01 | 3.41 | 0.2 | 1.9 | 30.5 |
| Indium Cake "X" | None | ------ | None | None | 0.1 | Trace | 0.5 | 43.0 |

[1] Expressed in percent (dry basis), except filtrate "B" which is gm./l.

To the indium-bearing filtrate "B," there was added 350 lbs. sodium hyposulphite whereby (following agitation and filtration) there was obtained 170 lbs. of wet filter cake equivalent to 148 lbs. dry cake "C" having the analysis shown in the table. The filtrate from this operation was diluted to 200 cu. ft. and 10% monosodium phosphate solution in slight stoichiometrical excess of the indium present, together with sufficient 50% NaOH solution to bring the pH of the filtrate to approximately 3.2, was added. Upon filtering, there was obtained 432 lbs. of wet filter cake equivalent to 173 lbs. dry cake "D" having the analysis shown in the table.

The filter cake "D" was redissolved with 254 lbs. 98% $H_2SO_4$ + 100 cu. ft. $H_2O$, 12 lbs. of sodium hyposulphite added, and filtered. The wet cake amounted to 1.2 lbs. equivalent to 0.7 lb. on a dry basis containing 3.9% As and 50.2% Se and Te. The filtrate was diluted to 200 cu. ft. and the indium again precipitated using 3 cu. ft. of 10% monosodium phosphate solution with sufficient NaOH to bring the pH to 3.2. Upon filtering there was obtained 488 lbs. of wet filter cake equivalent on a dry basis to 123 lbs. indium cake "X," the analysis of which is shown in the table, and which contained nearly 98.7% of the indium in the original indium-bearing material. At this point the indium may be directly converted to metal in manners known to the art or, if desired, further purified and then converted. In the latter case, either a repetition of the phosphate treatment or conversion to the hydroxide by treatment with NaOH, is satisfactory.

From the foregoing description, it will be apparent that the present invention provides a simple procedure for separating indium from its common contaminants such as those hereinbefore mentioned. While other factors may be involved, the beneficial results are believed to be largely attributable to a rather complete reduction of not only arsenic and iron by the sodium hyposulphite but of copper and selenium and tellurium as well.

While certain novel features of the invention have been pointed out and disclosed, it will be understood that various omissions, substitutions and changes may be made by those skilled in the art within the scope of the invention as defined by the following claims.

What is claimed is:

1. In a process for recovering indium from indium-bearing material by solubilizing the indium in an acid solution, purifying the resulting solution, and subsequently recovering indium by precipitation from the purified solution, the improvement in purification which consists in reacting the acid solution with sodium hyposulphite ($Na_2S_2O_4$) thereby rendering such contaminants as copper, arsenic, selenium and tellurium amenable to removal by filtration.

2. The method of purifying an acid solution of indium with respect to such contaminants as copper, arsenic, selenium and tellurium which comprises incorporating sodium hyposulphite ($Na_2S_2O_4$) in the solution, and filtering.

3. The process for treating indium-bearing material which comprises reacting same with acid to solubilize the indium, filtering, incorporating sodium hyposulphite ($Na_2S_2O_4$) in the first filtrate, again filtering, and precipitating indium from the second filtrate.

4. The method of purifying indium in acid solution which comprises reacting same with sodium hyposulphite ($Na_2S_2O_4$), filtering, precipitating indium from the filtrate, redissolving the indium precipitate in acid solution, reacting the latter with a further quantity of sodium hyposulphite, and filtering.

JAMES L. HART.

REFERENCES CITED

The following references are of record in the file of this patent:

UNITED STATES PATENTS

| Number | Name | Date |
|---|---|---|
| 2,241,438 | Zischkau et al. | May 13, 1941 |
| 2,384,610 | Doran et al. | Sept. 11, 1945 |

OTHER REFERENCES

Mellor, "A Comprehensive Treatise on Inorganic and Theoretical Chemistry," Longmans, Green & Co., N. Y., 1937, vol. 5, p. 389.